Patented Feb. 27, 1951

2,543,333

UNITED STATES PATENT OFFICE 2,543,333

DERIVATIVES OF v-TRIAZOLO (d) PYRIMIDINE AND METHODS OF PREPARING THE SAME

Robert P. Parker, Somerville, and John S. Webb, Bound Brook, N. J., assignors to American Cyanamid Company, New York, N. Y., a corporation of Maine No Drawing. Application February 2, 1950, Serial No. 142,076

14 Claims. (Cl. 260—251)

1

This invention relates to new organic compounds. More particularly, the invention relates to 2-(aromatic or heterocyclic)-5,7-disubstituted-2-v-triazolo(d)pyrimidines and methods of preparing these compounds.

In U. S. Patent 2,407,204 English et al. described certain triazolo(d)pyrimidines and methods of preparing such compounds. These compounds substituted in the 5 and 7-positions with various groups were found to inhibit the growth of certain microorganisms. The method described in this patent is not capable of preparing compounds substituted in the 2-position.

We have now found that related compounds having an aromatic or heterocyclic radical in the 2-position effect the growth of neoplasms and myelogenous leukemia and that the presence of these radicals in the 2-position favorably modifies the properties of the triazolo(d)pyrimidines in some cases. These compounds in one of their tautomeric forms may be represented by the following structural formula:

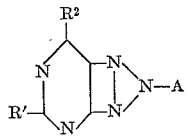

in which R' and R² represent the same or different members of the group consisting of amino, dialkylamino, mercapto, alkylmercapto and hydroxyl radicals and A represents an aromatic or heterocyclic radical.

These compounds are in general white crystalline solids, insoluble in water and melt with decomposition at high temperatures. In alkaline solution at high dilution they often exhibit strong fluorescence.

The compounds of the present invention are generally prepared by reacting a diazonium salt of an aromatic amine with a 4-aminopyrimidine unsubstituted in the 5-position and oxidizing the resulting azo compound to produce the desired v-triazolo(d)pyrimidine.

As the first intermediate in the present invention a number of aromatic amines can be used such as aniline, para-anisidine, para-chloroaniline, para-aminobenzoic acid, N-(4-aminobenzoyl)-glutamic acid, 4-aminostilbene, N'-(2-pyridyl)sulfanilamide, N' - (2 - pyrimidyl) - sulfanilamide, 3-aminopyridine, etc., which are reacted with nitrous acid to produce the desired diazonium salt. In preparing the diazonium salts it is preferred that the nitrous acid be obtained by reacting a salt of nitrous acid with a mineral acid,

2 although nitrous acid from any source can be used in the preparation of diazonium salts.

The second intermediate may be practically any substituted 4-aminopyrimidine that is capable of coupling with diazonium salts in the 5-position. Among the substituted pyrimidines which have been found useful in the present process are the following: 2,4,6-triaminopyrimidine, 2-hydroxy-4,6-diaminopyrimidine, 2,6-dihydroxy-4-aminopyrimidine, 2,4-diamino-6-hydroxypyrimidine, 2-dimethylamino-4,6-diaminopyrimidine, 2-diethylamino-4,6-diaminopyrimidine, 2,4-diamino-6-dimethylaminopyrimidine, 2,4-diamino-6-diethylaminopyrimidine, 2-mercapto-4,6-diaminopyrimidine, 2-ethylmercapto-4-amino-6-hydroxypyrimidine, and the like. These intermediates contain amino groups and obviously will form acid salts. Likewise the acid salts can be used in the present invention in the same manner as the amines themselves. These compounds are known and can be prepared by methods described in the chemical literature.

In carrying out the process of the present invention the diazotized aromatic amine is reacted with the substituted 4-aminopyrimidine in the presence of a substantially aqueous solvent at a temperature of from 0° to 25° C. The reaction mixture is then preferably heated to a temperature of from 70° to 100° C. The product obtained is separated by filtration and heated with an oxidizing agent in the presence of a solvent in order to complete the formation of the v-triazolo(d)-pyrimidine. The oxidizing agents which can be used may be copper sulfate, chromic acid, ferric chloride, cupric sulfate-ammonia, etc., in the presence of a solvent, such as pyridine. It is also preferred that a stream of air be passed through the mixture during the course of oxidation in order to complete the oxidation desired in the shortest time, though this is not essential.

The product may be purified by dissolving in dilute alkaline or acid solution followed by treatment with decolorizing carbon and recovering the product by precipitation and filtration or by crystallization from a suitable organic solvent.

The invention will now be illustrated in greater detail by means of the following specific examples showing the preparation of representative v-triazolo(d)pyrimidines.

Example 1

Aniline hydrochloride, 39 parts, is dissolved in a mixture of 600 parts of water and 71 parts of concentrated hydrochloric acid. The solution is cooled to about 5° C. and a solution of sodium nitrite, 21 parts, in 50 parts of water is added dropwise during stirring.

A solution of 2,4,6-triaminopyrimidine dihydrochloride is prepared by slurrying 67 parts of 2,4,6-triaminopyrimidine sulfate-hydrate in 500 parts of hot water, adding a solution of 75 parts of barium chloride dihydrate in 200 parts of water and filtering off the barium sulfate which forms. The filtrate from the barium sulfate cake is treated with 5 parts of decolorizing carbon, clarified, cooled to 10° C., and added to the above diazotized aniline solution.

The pH of the mixed solutions is adjusted to about 3 by the addition of sodium acetate trihydrate, whereupon a yellow precipitate begins to form. The reaction mixture is stirred at 10°–15° C. for one hour, and then heated to 95° C. The yellow precipitate is filtered off, washed well with water and sucked as dry as possible. The yield of damp azo cake is about 110 parts. Ninety parts of the damp azo compound is refluxed overnight in a mixture of water, 500 parts, pyridine, 500 parts, and copper sulfate pentahydrate, 50 parts, while passing a slow stream of air through the reaction mixture. After the refluxing period, the solid which is present in the dilute pyridine, copper sulfate mixture, is filtered off, washed well with water, and dried at 60° C. The yield of 2-phenyl-5,7-diamino-2-v-triazolo(d)-pyrimidine thus obtained is 25 parts. This product is insoluble in dilute sodium hydroxide solution, but soluble in hot dilute hydrochloric acid. It is also slightly soluble in hot alcohol and readily soluble in hot acetic acid, from which it crystallizes on cooling in a cottony mass of pale yellow filaments.

The product is purified by dissolving it in 50 times its weight of boiling water by the addition of the minimum amount of hydrochloric acid, treating the solution with decolorizing carbon, and cooling the clarified solution, whereupon the hydrochloride crystallizes in long, fine needles. These are recrystallized from water to give a white product which sublimes at temperature of about 300° C.

*Example 2*

Aniline hydrochloride, 39 parts, is dissolved in a mixture of water, 600 parts, and concentrated hydrochloric acid, 71 parts. The solution is cooled to 5° C. and a solution of sodium nitrite, 21 parts, in water, 50 parts, is added dropwise during stirring. To this resulting cold diazonium solution there is added 38 parts of 2,4-diamino-6-hydroxypyrimidine, whereupon a light yellow precipitate forms. Sodium acetate trihydrate, about 75 parts, is then added to the mixture until the pH is about 3. The resulting thick slurry is diluted to 2,000 parts and heated to 90° C., whereupon the color of the precipitate becomes darker. The solid is then filtered off, washed with hot water until the washings run colorless and dried to constant weight at 55° C. Yield, 64 parts.

A mixture of the above azo compound, 55 parts, pyridine 500 parts, water 500 parts, and copper sulfate pentahydrate 50 parts, is refluxed and stirred overnight with a stream of air blowing through it. The light colored solid which forms in the reaction mixture is filtered off, washed with hot water, until the washings run colorless, washed with acetone, and dried to constant weight at 55° C. The yield of 2-phenyl-5-amino-7-hydroxy-2-v-triazolo(d)pyrimidine is 54 parts. Purification of the product is effected by dissolving it in about 20 times its weight of boiling water, with the addition of dilute sodium hydroxide. The resulting solution is decolorized by treating it with small amounts of lime, sodium hydrosulfite and decolorizing carbon. After clarification, the product is precipitated by acidifying the hot solution with dilute mineral acid. The solid which separates is filtered off, washed well with water, and dried to constant weight at 95° C. Yield, 44 parts. The purified material is an almost white crystalline powder which melts with decomposition above 300° C. It is insoluble in water, dilute acids and most common organic solvents, but dissolves readily in dilute caustic solutions. 2-phenyl-5-amino-7-hydroxy-2-v-triazolo(d)pyrimidine in alkaline solution at high dilution exhibits a strong lavender-blue fluorescence.

*Example 3*

2-phenyl-5,7-diamino-2-v-triazolo(d)pyrimidine, 23 parts, is dissolved in a mixture of water 1,000 parts and 5 N hydrochloric acid, 50 parts, and the mixture is heated to boiling. A solution of 14 parts of sodium nitrite in 100 parts of water is then added slowly dropwise with stirring. The mixture is then boiled a few minutes more and the fine light-colored precipitate which forms is filtered off, washed with water and dried. Yield, 7 parts. To the filtrate from this first crop of product there is added 50 parts of 5 N hydrochloric acid. It is then reheated to boiling and treated with another portion of sodium nitrite solution as before. In this manner a second crop of product is obtained. Yield, 4 parts. The combined two crops of crude product are dissolved in 500 parts of water by the addition of dilute sodium hydroxide. The solution is heated to boiling, decolorized by the addition of a small amount of sodium hydrosulfite and decolorizing carbon. After clarification, the solution is acidified with dilute hydrochloric acid, whereupon an almost white crystalline powder precipitates which is a hydrate of the desired compound. This is filtered off, washed with water and dried at 55° C. Yield, 10 parts of 2-phenyl-5,7-dihydroxy-2-v-triazolo(d)pyrimidine. In alkaline solution at high dilution this material exhibits a strong blue fluorescence.

*Example 4*

By substituting para-anisidine, para-chloroaniline, para-aminobenzoic acid, N-(4-aminobenzoyl)-glutamic acid and N'-(2-pyrimidyl)-sulfanilamide for aniline, respectively, in the procedure of Example 2 the following compounds are obtained: 2-para-methoxy-phenyl-5-amino-7-hydroxy-2-v-triazolo(d)pyrimidine, 2-para-chloro-phenyl-5-amino-7-hydroxy-2-v-triazolo(d)pyrimidine, 2-para-carboxy-phenyl-5-amino-7-hydroxy-2-v-triazolo(d)pyrimidine and N-[4-(5-amino-7-hydroxy-2-v-triazolo(d)pyrimid-2-yl)benzoyl] glutamic acid, respectively.

*Example 5*

Twenty-three parts of finely ground 2-phenyl-5-amino-7-hydroxy-2-v-triazolo(d)pyrimidine are dissolved in 460 parts concentrated sulfuric acid. Then during stirring there is added slowly dropwise 7½ parts of 96% nitric acid. The temperature of the reaction mixture rises about 10° to 20° C. during the addition. After all the nitric acid has been added the mixture is stirred until the heat of the reaction is dissipated. The resulting clear, pale yellow solution is then poured onto 1,250 parts of flake ice whereupon a cream-colored precipitate forms. This is filtered off, slurried in 1,000 parts of water which causes the solid to turn yellow. The product is filtered off, washed well with water and dried. A yield of 23 parts is obtained. On analysis this product agrees with the theoretical values for 2-(4-nitrophenyl)-5-amino-7-hydroxy-2-v-triazolo(d)pyrimidine.

*Example 6*

2 - (4 - nitrophenyl)-5-amino-7-hydroxy-2-v-triazolo(d)pyrimidine, 27 parts, is dissolved in 700 parts of boiling water containing 40 parts of sodium hydroxide and 70 parts of sodium hydrosulfite dihydrate is added in small portions during stirring and continuous boiling. After all the hydrosulfite has been added the resulting clear, brown solution is treated with decolorizing carbon, clarified, acidified with hydrochloric acid and boiled to coagulate the by-product sulfur. The precipitate which forms is separated and discarded. The solution is again treated with decolorizing carbon, clarified and the crude product is precipitated by making the solution alkaline with dilute ammonium hydroxide. After filtering off the crude it is purified by redissolving it in dilute sodium hydroxide solution, treating with activated charcoal, clarifying and finally acidifying the solution with acetic acid. The buff-colored powder which precipitates is filtered off, washed with water and dried. A yield of 5 parts of 2-(4-aminophenyl)-5-amino-7-hydroxy-2-v-triazolo(d)pyrimidine is obtained.

*Example 7*

4-aminostilbene, 98 parts, is mixed with 236 parts of concentrated hydrochloric acid and the resulting mass is stirred into a mixture of 1,000 parts each of flake ice and water. A solution of sodium nitrite, 35 parts, in water, 350 parts, is then added dropwise during stirring keeping the temperature between 5° and 10° C. 2,4-diamino-6-hydroxypyrimidine, 63 parts, is then stirred into the diazotized solution and sufficient sodium acetate is added to bring the pH of the mixture to about 3. A dark red-brown precipitate begins to form and the resulting slurry is stirred 1 hour at 10° to 15° C., then heated to 95° C. The solid intermediate azo compound is filtered off, washed well with hot water and pressed as dry as possible.

To complete the reaction the above damp filter cake is refluxed overnight with a mixture of pyridine, 1,500 parts; water, 1,500 parts; and copper sulfate pentahydrate, 300 parts. During the refluxing period the reactants are stirred and a slow stream of air is passed through the reaction mixture. The light-colored solid which separates in the copper-pyridine mixture is filtered off, washed well with water and dried. The yield of crude product is 150 parts.

For purification the crude is dissolved in about 40 times its weight of boiling 50% ethanol containing 2 molecular equivalents of sodium hydroxide. The resulting solution is treated with a slight excess of sodium hydrosufite, then decolorizing carbon, clarified, and the purified product is precipitated by acidifying with hydrochloric acid. The cream-colored solid which separates is filtered off, washed with water and dried at 95° C. The recovery of 2-(4-styrylphenyl)-5-amino - 7 - hydroxy-2-v-triazolo(d)pyrimidine is about 95%.

*Example 8*

3-aminopyridine, 47 parts, is dissolved in 500 parts of water containing 200 parts of concentrated hydrochloric acid. Flake ice, 500 parts, is added and then a solution of sodium nitrite, 35 parts, in water, 125 parts, is added dropwise during stirring over a 15 minute period. 2,4-diamino-6-hydroxypyrimidine, 63 parts, is then stirred into the diazotized solution and sufficient sodium acetate is added to bring the pH of the mixture to about 3. Stirring is continued for 1 hour keeping the temperature of the mixture at 10° C. to 15° C. During this time a yellow precipitate separates forming a heavy slurry. The reaction mixture is diluted to 3,000 parts and heated to 90° C. The precipitate of intermediate azo compound is filtered off, washed well with water and pressed as dry as possible.

To complete the formation of the desired product the above damp filter cake is refluxed and stirred overnight with a mixture of: pyridine, 1,000 parts; water, 900 parts; and copper sulfate pentahydrate, 200 parts. During the refluxing period, a slow stream of air is passed through the reaction mixture. The tan precipitate which forms is filtered off, washed copper-free with water and dried at 60° C. The amount of crude product thus obtained is 61 parts.

The crude product is purified by dissolving it in 1,200 parts of boiling water containing 12 parts of sodium hydroxide and treating the solution with 1 part of sodium hydrosulfite, 1 part of lime and 5 parts of decolorizing charcoal. After clarification the product is precipitated by acidification with acetic acid, filtered off, washed and dried. The purification process is then repeated and there is finally obtained 56 parts of 2-(3-pyridyl) - 5 - amino - 7 - hydroxy - 2 - v - triazolo(d)pyrimidine in the form of a cream-colored powder.

*Example 9*

Aniline hydrochloride, 130 parts, is dissolved in a mixture of: water, 1,200 parts; flake ice, 1,200 parts; and concentrated hydrochloric acid, 160 parts. A solution of sodium nitrite, 70 parts, in water, 250 parts, is added dropwise during stirring over a period of 30 minutes. 2-dimethylamino-4-amino-6-hydroxypyrimidine, 154 parts, is then stirred into the diazotized aniline solution and sufficient sodium acetate is added to bring the pH of the mixture to about 3. A yellow precipitate begins to separate and the mixture is stirred at 10° to 15° C. for 1 hour. The resulting slurry is heated to 70° C. whereupon the solid dissolves forming a yellow-brown solution. This is then cooled to 10° C. and the yellow solid which crystallizes is filtered off, washed with ice water and pressed as dry as possible.

The damp filter cake is then refluxed overnight with a combination of: water, 1,000 parts; pyridine, 1,000 parts; and copper sulfate pentahydrate, 250 parts, with a stream of air passing through the mixture. The purple-colored solid which forms is filtered off, washed well with water and dried at 65° C. The yield of crude product is 205 parts.

To purify the crude compound, it is slurried in 3,000 parts of boiling water and 51 parts of 50% sodium hydroxide added. The dark purple solid which does not dissolve is filtered off and the brown filtrate is treated with small amounts of sodium hydrosulfite, lime and decolorizing carbon. After clarification the solution is neutralized with acetic acid and the pale yellow crystalline precipitate which forms is filtered off, washed and dried. The purification process is repeated and the pure product is finally obtained by adding the hot, clarified alkaline solution to 500 parts of boiling water containing 50 parts of acetic acid then filtering, washing and drying the precipitate as before. In this way there is obtained 105 parts of 2 - phenyl - 5 - dimethylamino - 7 - hydroxy-2-v-triazolo(d)pyrimidine, a soft, white crystalline powder which has a melting range of 298–303° C.

*Example 10*

Aniline hydrochloride, 26 parts, is dissolved in 250 parts of water then 41 parts of concentrated hydrochloric acid and 250 parts of flake ice are added. This mixture is diazotized by the dropwise addition of a solution of sodium nitrite, 14 parts, in water, 50 parts, during stirring. 2 - dimethylamino - 4,6 - diaminopyrimidine, 30 parts, is stirred into the diazotized aniline solution and sufficient sodium acetate is added to bring the pH of the mixture to about 3, whereupon a yellow precipitate begins to form. The mixture is stirred for 1 hour at 10° to 15° C. then diluted to 2,000 parts and heated to 90° C., which gives a clear solution. This is made alkaline with ammonium hydroxide and cooled. The yellow precipitate of intermediate azo compound which forms is filtered off, washed well with water and pressed as dry as possible.

To complete the formation of the desired product the above damp filter cake is stirred and refluxed overnight with a mixture of: pyridine, 450 parts; water, 400 parts and copper sulfate pentahydrate, 90 parts. During this refluxing period a slow stream of air is passed through the reaction mixture. After cooling the crude product which separates in the form of brown crystals is filtered off, washed well with water and dried at 55° C. The yield of crude material is 35 parts.

The crude product is reprecipitated by dissolving it in about 20 times its weight of warm 0.25 N hydrochloric acid, treating this solution with decolorizing carbon then making it alkaline by the addition of dilute ammonium or sodium hydroxide. After several such reprecipitations the product is obtained in the form of a pale yellow crystalline powder which has a melting range of 270°–272° C. The recovery of 2-phenyl-5 - dimethylamino - 7 - amino - 2 - v - triazolo-(d)pyrimidine as purified material is 93%.

*Example 11*

$N^1$-(2-pyrimidyl)sulfanilamide, 125 parts, is ground to a fine powder and slurried in 1,000 parts of cold water. 5 N hydrochloric acid, 250 parts, is added and the mixture is cooled to +5° C. by means of an ice bath. A solution of sodium nitrite, 35 parts, in water, 100 parts, is then added dropwise during stirring, keeping the temperature of the mixture at 5°–10° C. Stirring is continued until most of the sulfadiazine has gone into solution. The small amount of undissolved material present is then filtered off. 2,4-diamino-6-hydroxypyrimidine, 63 parts, is added to the filtrate and the pH of the mixture is adjusted to about 3 by the addition of sodium acetate whereupon a dark yellow precipitate begins to form. The mixture is stirred for 1 hour at 10° to 15° C. then diluted to 3,000 parts and heated to 85° C. The precipitate of intermediate azo compound is filtered off, washed well with hot water and pressed as dry as possible.

To complete the formation of the desired product the above damp filter cake of azo compound is refluxed and stirred overnight with a mixture of: pyridine, 1,500 parts; water, 1,500 parts; and copper sulfate pentahydrate, 150 parts. During the refluxing period a slow stream of air is passed through the reaction mixture. The dark green, sandy precipitate which forms is filtered off, washed well with water and dried. This material is a combination of copper and the desired compound. To isolate the pure product the above green solid is dissolved in a mixture of water, 1,500 parts and 5 N sodium hydroxide, 200 parts. The solution is heated to boiling and sodium hydrosulfite dihydrate, 40 parts, is added in small portions. This causes a small quantity of a black, heavy precipitate to form which is filtered off and discarded. The filtrate is then treated at the boil with small amounts of lime, sodium hydrosulfite and decolorizing carbon. After clarification, the resulting pale yellow solution is added slowly to 1,000 parts of boiling water which is kept acid by the concomitant addition of dilute hydrochloric acid. The cream-colored precipitate which separates is filtered off, washed by slurrying in 1,000 parts of hot water, refiltered and dried at 100° C. The yield is 89 parts of an almost white powder which is the monohydrate of N-(2-pyrimidyl)-4-(5-amino-7-hydroxy-2-v-triazolo(d)pyrimid-2-yl)-benzenesulfonamide.

We claim:

1. Chemical compounds having the general formula:

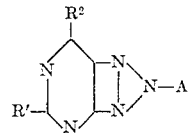

in which R' and R² are members of the group consisting of amino, dialkylamino, mercapto, alkylmercapto and hydroxyl radicals and A is a member of the group consisting of radicals of the benzene and pyridine series.

2. Chemical compounds having the general formula:

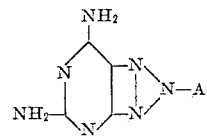

in which A is a monocyclic aromatic radical of the benzene series.

3. A method which comprises reacting a member of the group consisting of a primary aromatic amine of the benzene series and a primary heterocyclic amine of the pyridine series with nitrous acid and subsequently with a compound having the formula:

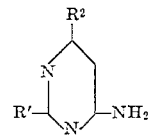

in which R' and R² are members of the group consisting of amino, dialkylamino, mercapto, alkylmercapto and hydroxyl radicals, oxiding the resulting product and recovering therefrom a compound having the formula:

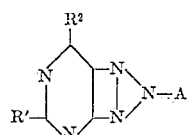

in which R' and R² are as defined above and A is a member of the group consisting of radicals of the benzene and pyridine series.

4. A method which comprises reacting a monocyclic aromatic amine of the benzene series with nitrous acid and subsequently with 2,4,6-triaminopyrimidine, oxidizing the resulting product and recovering therefrom a compound having the formula:

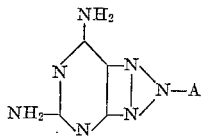

in which A is a monocyclic aromatic radical of the benzene series.

5. A method which comprises reacting aniline with nitrous acid and subsequently with 2,4,6-triaminopyrimidine, oxidizing the resulting product and recovering therefrom 2-phenyl-5,7-diamino-2-v-triazolo(d)pyrimidine.

6. A method which comprises reacting aniline with nitrous acid and subsequently with 2,4-diamino-6-hydroxypyrimidine, oxidizing the resulting product and recovering therefrom 2-phenyl-5-amino-7-hydroxy-2 - v - triazolo(d)pyrimidine.

7. A method which comprises reacting aniline with nitrous acid and subsequently with 2,6-dihydroxy-4-aminopyrimidine, oxidizing the resulting product and recovering therefrom 2-phenyl-5,7-dihydroxy-2-v-triazolo(d)pyrimidine.

8. A method which comprises reacting aniline with nitrous acid and subsequently with 2-dimethylamino-4-amino-6-hydroxypyrimidine, oxidizing the resulting product and recovering therefrom 2-phenyl-5 - dimethylamino - 7 -hydroxy-2-v-triazolo(d)pyrimidine.

9. A method which comprises reacting 3-aminopyridine with nitrous acid and subsequently with 2,4-diamino-6-hydroxypyrimidine, oxidizing the resulting product and recovering therefrom 2-(3-pyridyl)-5-amino-7 - hydroxy - 2 - v - triazolo(d)pyrimidine.

10. The compound 2-phenyl-5,7-diamino-2-v-triazolo(d)pyrimidine having the formula:

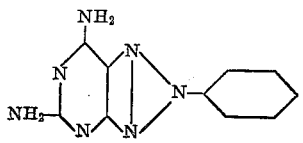

11. The compound 2-phenyl-5-amino - 7 - hydroxy-2-v-triazolo(d)pyrimidine having the formula:

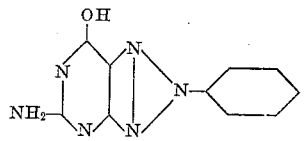

12. The compound 2-phenyl-5,7-dihydroxy-2-v-triazolo(d)pyrimidine having the formula:

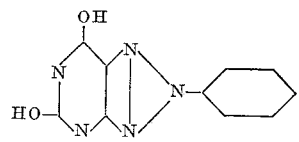

13. The compound 2-phenyl-5-dimethylamine-7-hydroxy-2-v-triazolo(d)pyrimidine having the formula:

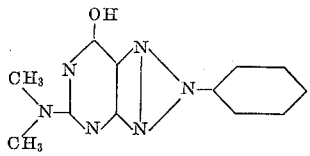

14. The compound 2-(3-pyridyl)-5-amino-7-hydroxy-2 - v - triazolo(d)pyrimidine having the formula:

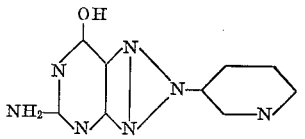

ROBERT P. PARKER.
JOHN S. WEBB.

No references cited.